Nov. 12, 1957 W. S. EVERETT Re. 24,390

ADJUSTABLE SURGE ALLEVIATOR

Original Filed March 30, 1953

WILHELM S. EVERETT
INVENTOR.

BY F. J. Schmitt
Max Geldin
ATTORNEYS

United States Patent Office

Re. 24,390
Reissued Nov. 12, 1957

24,390

ADJUSTABLE SURGE ALLEVIATOR

Wilhelm S. Everett, Santa Paula, Calif.

Original No. 2,731,984, dated January 24, 1956, Serial No. 345,745, March 30, 1953. Application for reissue October 25, 1956, Serial No. 618,416

10 Claims. (Cl. 138—30)

(Granted under Title 35, U. S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States of America for governmental purposes without the payment of any royalties thereon or therefor.

The present invention relates to an adjustable surge alleviator and more particularly to an adjustable surge alleviator adapted for use in connection with the conduits of a fluid conveying system wherein the fluid is forced through the conduits in pulsations or surges by means of reciprocating pumps, compressors, engines or similar sources of pressure.

Conventional sources of pressure utilized in fluid conveying systems produce undesirable surges in the fluid stream thereof and accordingly various devices have been developed for damping out these surges. Such devices are adapted to be incorporated in the conducting conduits of the system and are well known, as shown for example in U. S. Patent No. 2,530,190. Prior art devices merely serve to cushion the pulsations of the fluid, thereby affording only a limited attenuation of the undesirable surges, and performance of these devices is not uniform for pulsations of various frequencies.

The present invention utilizes a surge chamber which is connected in parallel with a conducting conduit whereby surges in the fluid stream in the conduit are communicated to one portion of the chamber which is so designed as to suitably reduce the velocity of the surges. The surges of reduced velocity are then directed back into the conduit out of phase with the surges in the fluid stream, whereupon the opposing surges will tend to cancel each other out, thereby substantially eliminating surges in the fluid downstream of the invention device. The present invention may be suitably adjusted to give optimum efficiency at different pulsating frequencies and therefore enables uniform, high-efficiency operation at various frequencies.

An object of the present invention is the provision of a new and novel adjustable surge alleviator which will substantially eliminate surges in a fluid conveying system.

Another object is to provide an adjustable surge alleviator which enables uniform, high-efficiency operation at various pulsation frequencies.

A further object of the invention is the provision of an adjustable surge alleviator which is simple in construction and employs a minimum of parts, yet is sturdy and efficient in operation.

Other objects and many of the attendant advantages of this invention will be readily appreciated as the same becomes better understood by reference to the following detailed description when considered in connection with the accompanying drawings wherein.

Figure 1:
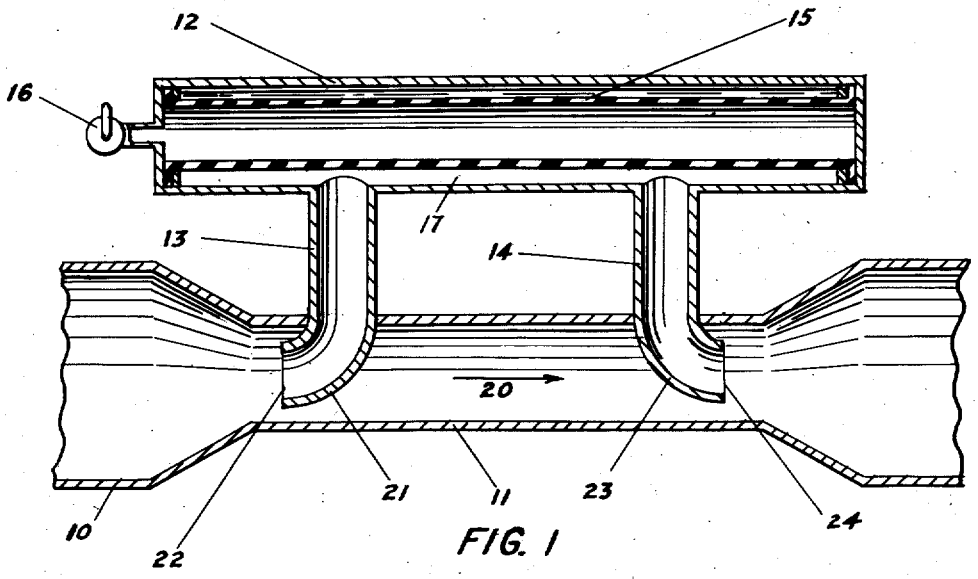
Figure 1 shows a sectional view of a preferred embodiment of the invention.

Referring now to the drawing, there is shown in Figure 1 a conduit 10 which is adapted to be suitably connected in a fluid conveying system and which has a restricted portion 11 formed at an intermediate portion thereof for increasing the velocity of the fluid stream in the conduit in a well-known manner. A tubular, hollow fluid container or surge chamber 12 closed at both ends thereof and having an enclosed cavity 17 formed therein is disposed in parallel relation to conduit 10 and cavity 17 communicates with the interior of the restricted portion of conduit 10 by two connecting conduits 13, 14 which open into the interiors of members 10 and 12 at longitudinally spaced portions thereof, respectively.

Member 12 has positioned therein an elongated deformable member or control means 15 formed of flexible material such as butyl rubber, silicone rubber or the like. A suitable valve 16 is provided at one end of the chamber for inflating or deflating member 15 by introducing into or venting gas from the interior thereof to vary its size and accordingly alter the volume of fluid in the interior of member 12.

The device illustrated in Figure 1 is particularly adapted for use in conveying systems wherein the fluid in the system is a liquid, and the fluid may be considered as flowing in the direction of arrow 20. Conduits 13 and 14 and the interior of chamber 12 are filled with the same fluid except for that portion of the chamber which is enclosed by member 15. As the fluid stream flows along conduit 10, surges or pulsations occur in the fluid due to the inherent operation of a conventional source of pressure such as a reciprocating pump, compressor, engine or the like.

Conduit 13 has an elbow portion 21 disposed within conduit 10, and this portion has an open end 22 directed upstream of the device thereby causing the fluid stream in member 10 to impinge upon the open end of conduit 13. Conduit 14 also has an elbow portion disposed within conduit 10, and this portion has an open end 24 directed downstream of the device. There is a continuous flow of fluid through members 13, 14 and 17, but such flow is insignificant as compared to the amount of fluid flowing through conduit 10. Approximately 10 percent or less of the total flow of fluid within conduit 10 will actually flow through members 13, 14 and cavity 17 because of the resistance to flow created by the friction of the fluid against the walls of members 12, 13 and 14 and the outer periphery of member 15. The inner periphery of member 12 and the outer periphery of member 15 present large areas which create a substantial resistance to flow through cavity 17 whereby only a small amount of fluid flows into member 13 as compared to the total fluid flow through conduit 10. However, pulsations or surges of the fluid in member 10 will be transmitted to cavity 17 through the fluid in conduit 13. The surges which are transmitted to cavity 17 are then communicated through the intermediary of the fluid therein to the fluid in conduit 14. The surges will in turn be transmitted through the fluid in conduit 14 by way of elbow portion 23 and opening 24 back into the fluid stream in conduit 10.

The fluid in conduits 13, 14 and cavity 17, and the gas filled deformable member 15 constitute a spring-mass system, and by varying the volume of member 15, the natural frequency of the spring-mass system is altered, thereby changing the velocity of the surges passing through the fluid in cavity 17. The surges produced by the source of pressure of the conveying system produce peaks of high pressure and valleys of low pressure which are transmitted by the fluid in the system. Therefore, by varying the volume of member 15, the velocity of the surges transmitted by the fluid in conduits 13, 14 and cavity 17 may be suitably reduced such that the surges passing back into the fluid stream at opening 24 are out of phase with the surges of the fluid in conduit 10 so that a peak in the surges emitted from opening 24 coincides with a valley in the surges in the fluid stream and a valley in the surges emitted from opening 24 coincides with a peak in the surges in the fluid stream, whereby the opposing surges will tend to cancel each other out and produce a smooth fluid flow downstream of the device. In this manner, substantially all pulsations and surges in the fluid stream are eliminated.

It is evident that in order to obtain maximum efficiency of the device, the peaks of the surges issuing from opening 24 should correspond as nearly as possible with the valleys of the surges of the fluid in conduit 10. Therefore, since the frequency of the surges of the fluid stream depends upon the source of pressure utilized in the conveying system, the time delay of the surges passing through cavity 17 must also be varied in accordance with the particular source of pressure employed in the system. The velocity of the surges passing through cavity 17 may be altered by changing the volume of member 15, and consequently, the volume of member 15 may be altered to obtain optimum operating efficiency of the device at various frequencies. The proper volume of member 15 may be determined by introducing gas therein and visually observing the point at which the pulsations of the system are reduced to a minimum.

The restricted portion 11, as pointed out previously, increases the velocity of the fluid therein, and therefore magnifies the pressure differential in the peaks and valleys of the surges. The device will accordingly respond to surges having pressure differentials of small magnitude and is therefore quite sensitive.

When conduits 13 and 14 are connected to conduit 10 by means of elbow portions as shown, the device will sense dynamic pressure pulsations of the fluid stream. Other types of connections may be employed to sense different pressure variations. For example, conduits 13 and 14 may be connected flush with the outer periphery of portion 11 whereby the device will sense static pressure pulsations of the moving fluid.

Figure 2:
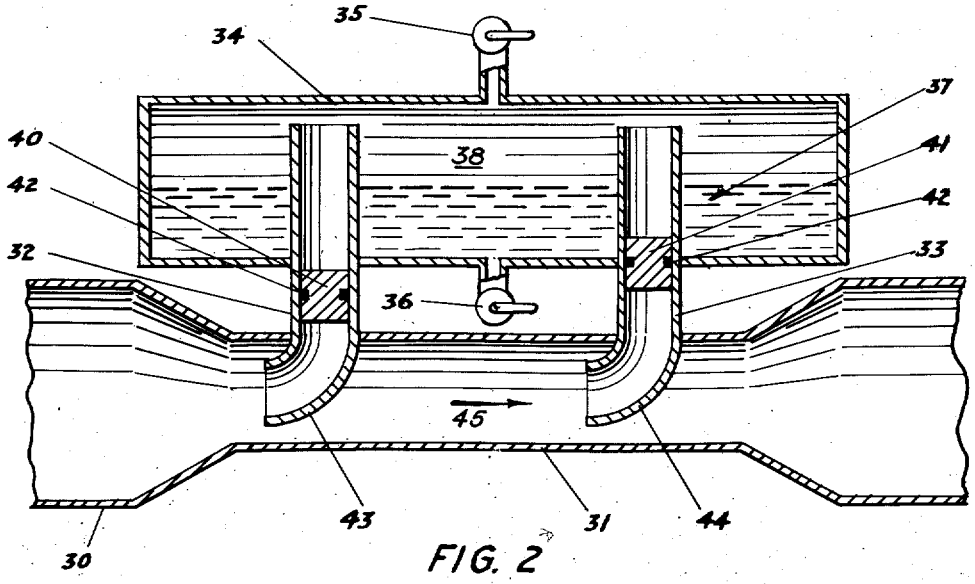
Figure 2 illustrates a sectional view of a modification of the device.

Figure 2 illustrates a modification of the device which is particularly adapted for use when the fluid in the system is a gas, and comprises a conduit member 30 having a restricted portion 31, the conduit and restricted portion corresponding respectively to conduit 10 and portion 11 of Figure 1. Connecting conduits 32 and 33 are similar to conduits 13 and 14 of Figure 1, and bring the interior of portion 31 into communication with an enclosed cavity 38 formed within a surge chamber 34 which is similar to the surge chamber 12 of Figure 1. It should be noted that conduits 32 and 33 extend upwardly into cavity 38 to a point below the top thereof, whereby a liquid substance may be introduced into the lower portion of the cavity and will be prevented from flowing into either of the connecting conduits. Chamber 34 is formed as an elongated, hollow member closed at either end thereof and has a suitable gas fill valve 35 mounted therein whereby a gas, preferably the same as the gas in conduit 30, may be introduced into cavity 38, and a suitable liquid fill valve 36 is provided in chamber 34 for introducing a liquid 37 into the cavity. The volume of liquid 37 may accordingly be selectively varied and serves the same purpose as member 15 in Figure 1.

Since the mass of the gas in conduits 32, 33 and cavity 38 is relatively small, it is desirable to provide additional masses to make the spring-mass system of the device more effective. Accordingly, free pistons 40 and 41 are slidably disposed within conduits 32 and 33 respectively and have O-ring or piston ring seals 42 disposed about the outer periphery thereof to prevent gas from leaking by the pistons. Pistons 40 and 41 are normally positioned at an intermediate portion of conduits 32 and 33 respectively to allow longitudinal movement of the pistons in the conduits.

Conduits 32 and 33 communicate with the interior of portion 31 by means of elbow portions 43 and 44 which are similar to elbow portions 21 and 23 of Figure 1. The fluid stream of the system may be considered as flowing in the direction of arrow 45, and elbow portions 43 and 44 open upstream of the device whereby pistons 40 and 41 will both be subjected to the dynamic pressure of the fluid flowing in conduit 30. In this manner, pistons 40 and 41 will be subjected to equal pressures, thereby maintaining them at an intermediate portion of conduits 32 and 33 respectively. If conduits 32 and 33 are connected flush with the outer periphery of portion 31, the pistons will also be subjected to equal pressures and thereby be maintained in proper operative position.

The operation of the device shown in Figure 2 is similar to the operation of the device in Figure 1, and surges of the gas stream will be transmitted through elbow portion 43, piston 40 and the gas in conduit 32 to the gas in cavity 38. The surges will in turn be transmitted to the gas in conduit 33 and piston 41, which will transmit the surges through elbow portion 44 back into the fluid stream.

It is evident that by varying the volume of liquid 37 in cavity 38, the velocity of the surges passing through the cavity may be suitably altered to cause the surges passing through portion 44 to be directed back into conduit 30 out of phase with the surges of the fluid stream.

A plurality of invention devices may be provided in a fluid conveying system, each of the devices utilizing different types of connections between conduits 10 and 30 and conduits 13, 14 and 32, 33, respectively, thereby enabling the elimination of various types of pressure pulsations. Although a single invention device will eliminate all harmonic frequencies of a given pulsation frequency, a plurality of devices may be used to eliminate various frequencies which are non-harmonic.

It should be noted that in both modifications of the device, the surge chamber is connected in parallel relation with a conducting conduit through which the fluid stream passes. In each case, there is substantially no flow of fluid through the cavity within the chamber, but a portion of the surges of the moving fluid are transmitted to the cavity and thence are returned to the conducting conduit out of phase with the surges of the fluid therein. Each device provides an adjustable spring-mass system which may be selectively adjusted to suitably reduce the velocity of the surges passing through the cavities in the chambers to insure optimum operating efficiency.

From the foregoing, it is evident that the present invention provides a new and novel adjustable surge alleviator which will substantially eliminate surges in a fluid conveying system and which enables uniform, high-efficiency operation at various pulsation frequencies. The device is simple in construction and employs a minimum of parts, yet is sturdy and efficient in operation.

Obviously many modifications and variations of the present invention are possible in the light of the above teachings. It is therefore to be understood that within the scope of the appended claims the invention may be practiced otherwise than as specifically described.

I claim:

1. An adjustable surge alleviator which comprises a first fluid conveying means, fluid containing means having an enclosed cavity formed therein; a plurality of fluid conveying means for communication of the interior of said first first fluid conveying means with said cavity in said fluid containing means, surge control means disposed within said cavity, means for adjusting said control means; said fluid containing means being in parallel relation with said first fluid conveying means, and means for producing a greater dynamic fluid pressure in one of said plurality of fluid conveying means than in another of said plurality of fluid conveying means whereby a portion of the surges of the fluid flowing through said first fluid conveying means are transmitted through said cavity and a portion of said surges are transmitted through said first fluid conveying means.

2. An adjustable surge alleviator which comprises a first conduit adapted to be connected into a fluid conveying system and conduct a fluid stream longitudinally therethrough, a closed hollow container, a plurality of connecting conduits opening into said first conduit at longitudinally spaced portions thereof and communicating with the interior of said container, surge control means positioned within said container, means for selectively adjusting the volume of said control means, a first one of said plurality of connecting conduits opening into said first conduit upstream of a second one of said plurality of connecting conduits, and means for producing a greater dynamic fluid pressure in said first connecting conduit than in said second connecting conduit.

3. An adjustable surge alleviator which comprises a first conduit adapted to be connected into a fluid conveying system and conduct a fluid stream longitudinally therethrough, a closed container having a cavity formed therein, a deformable member positioned within said cavity, means for selectively inflating or deflating said deformable member, a plurality of connecting conduits opening into said first conduit at longitudinally spaced portions thereof and communicating with said chamber cavity a first one of said plurality of connecting conduits opening into said first conduit upstream of a second one of said plurality of connecting conduits, and means for producing a greater dynamic fluid pressure in said first connecting conduit than in said second connecting conduit.

4. An adjustable surge alleviator which comprises a first conduit adapted to be connected into a fluid conveying system and conduct a fluid stream longitudinally therethrough, a closed container having a cavity formed therein, means for introducing into and venting gas from said cavity, means for introducing into and venting liquid from said cavity, a plurality of connecting conduits opening into said first conduit at longitudinally spaced portions thereof and communicating with said cavity.

5. A device as defined in claim 4 including a piston means slidably positioned within each of said connecting conduits.

6. A device as defined in claim 5 wherein said first conduit has a restricted portion adapted to increase the velocity of the fluid stream flowing therethrough, one of said connecting conduits having an end portion positioned within said restricted portion and opening upstream of the device, and another of said connecting conduits having an end portion positioned within said restricted portion and also opening upstream of the device.

7. An adjustable surge alleviator which comprises a first conduit adapted to be connected into a fluid conveying system and conduct a fluid stream therethrough, a first connecting conduit having one end thereof opening into said first conduit, a second connecting conduit having one end thereof in communication with said first conduit downstream of said first connecting conduit, a closed hollow container connecting the opposite ends of said connecting conduits for communication with one another, surge control means positioned within said container, means for adjusting said control means, and means for producing a greater dynamic fluid pressure in said first connecting conduit than in said second connecting conduit.

8. An adjustable surge alleviator which comprises a first conduit adapted to be connected into a fluid conveying system, a closed hollow container, a plurality of connecting conduits opening into said first conduit at longitudinally spaced portions thereof and communicating with the interior of said container, surge control means positioned within said container, and means for selectively adjusting the volume of said control means, said first conduit having a restricted portion and said plurality of conduits opening into said restricted portion.

9. An adjustable surge alleviator which comprises a first conduit adapted to be connected into a fluid conveying system and conduct a fluid stream longitudinally therethrough, a closed container having a cavity formed therein, a deformable member positioned within said cavity, means for selectively inflating or deflating said deformable member, a plurality of connecting conduits opening into said first conduit at longitudinally spaced portions thereof and communicating with said chamber cavity, said first conduit having a restricted portion adapted to increase the velocity of the fluid stream flowing therethrough, one of said connecting conduits having an end portion positioned within said restricted portion and opening upstream of the device, and another of said connecting conduits having an end portion positioned within said restricted portion and opening downstream of the device.

*10. A surge alleviator which comprises a first fluid conveying means, fluid containing means having an enclosed cavity formed therein, a plurality of fluid conveying means for communication of the interior of said first fluid conveying means with said cavity in said fluid containing means, said fluid containing means being in parallel relation with said first fluid conveying means, and means for producing a greater dynamic fluid pressure in one of said plurality of fluid conveying means than in another of said plurality of fluid conveying means whereby a portion of the surges of the fluid flowing through said first fluid conveying means are transmitted through said cavity and a portion of said surges are transmitted through said first fluid conveying means.*

References Cited in the file of this patent or the original patent

UNITED STATES PATENTS

| | | |
|---|---|---|
| 1,975,861 | Oldberg | Oct. 9, 1934 |
| 2,224,521 | Muller | Dec. 10, 1940 |
| 2,474,554 | Stephens et al. | June 28, 1949 |
| 2,497,020 | Singer | Feb. 7, 1950 |
| 2,501,773 | Johnson | Mar. 28, 1950 |
| 2,530,190 | Carver | Nov. 14, 1950 |
| 2,609,001 | Hebard | Sept. 2, 1952 |

FOREIGN PATENTS

| | | |
|---|---|---|
| 651,698 | Germany | Oct. 18, 1937 |